United States Patent
Strazza (10) Patent No.: US 6,587,858 B1
(45) Date of Patent: Jul. 1, 2003

(54) SYSTEMS AND METHODS FOR THE CONTROL OF DYNAMIC DATA AND REQUEST CRITERIA IN A DATA REPOSITORY

(75) Inventor: Steven Paul Strazza, 16117 Asa Dr., Spencerville, MD (US) 20868-9736

(73) Assignee: Steven Paul Strazza, Spencerville, MD (US)

(*) Notice: Subject to any disclaimer, the term of this patent is extended or adjusted under 35 U.S.C. 154(b) by 0 days.

(21) Appl. No.: 09/406,197

(22) Filed: Sep. 30, 1999

(51) Int. Cl.[7] .............................................. G06F 17/00
(52) U.S. Cl. ........................... 707/102; 707/100; 707/9; 707/10; 707/513
(58) Field of Search ...................... 707/1–10, 100–103, 707/200–203, 513; 717/104; 709/200–207; 706/47–48, 62

(56) References Cited

U.S. PATENT DOCUMENTS

| | | | | |
|---|---|---|---|---|
| 5,644,764 A | * | 7/1997 | Johnson et al. | 707/103 R |
| 5,978,811 A | * | 11/1999 | Smiley | 707/103 |
| 6,003,039 A | * | 12/1999 | Barry et al. | 707/102 |
| 6,101,556 A | * | 8/2000 | Piskiel et al. | 709/313 |
| 6,285,997 B1 | * | 9/2001 | Carey et al. | 707/103 R |

OTHER PUBLICATIONS

Raggett, David; HTML 3.2 Reference Specification; Document Rec–HTML32, Jan. 14, 1997, http://www.w3.org/tr/rel–html32.

Microsoft Corporation, Microsoft Data Access Components 2.5 SDK Beta, Jun. 1999. pp. 1–6.

Blaszczak, Mike; New ISAPI Classes in MFC4.1, Visual Studio 6.0 Periodical, Microsoft Systems Journal, 1996.

* cited by examiner

Primary Examiner—Kim Vu
Assistant Examiner—Joon Hwan Hwang
(74) Attorney, Agent, or Firm—Thomas M. Marshall

(57) ABSTRACT

Systems and methods for controlling the dissemination of data from a repository based on the substitution of content contained within a generated response. The systems and methods are used by the repository to allow for the transfer of data that is not known or anticipated until the time of an access. For each access whose intent is to provide data to the repository or to retrieve variable data held by the repository, the repository uses the systems and methods to manage novel information structures whose purpose is to facilitate the substitution of the variable portions of content and to apply a privilege value to the portions that are variable. Using the concept of a "notational fragment", the systems and methods are capable of assembling a variable result that has interaction with a data source. In addition, using a file structure known as a "Query Template Construct ("QTC")" the systems and methods provide for the language syntax of a data source to have variable portions.

7 Claims, 9 Drawing Sheets

**FIRST BASE SET ("FBS") OF A NOTATIONAL    200
TYPE FRAGMENT**

FIG. 3

QUERY TEMPLATE CONSTRUCT (QTC) FILE 300

RESULT
GET
FETCH — 205
ANS — 207
GET — 208

NON-SOURCE

601

SOURCE
RESULT
QUERY — 204
FETCH
ANS
FIELD
ANS
FIELD
GROUP — 203
FETCH
ANS
FIELD
END

QUERY-RESPONSE

602

SOURCE
RESULT
GROUP
FETCH
ANS
FIELD
GROUP
ANS

REPONSE-ONLY

FIG. 7

SYSTEMS AND METHODS FOR THE CONTROL OF DYNAMIC DATA AND REQUEST CRITERIA IN A DATA REPOSITORY

CROSS-REFERENCE TO RELATED APPLICATIONS

The co-pending U.S. Patent Application Ser. No. 09/406,196, filed on the same date as this application by the same inventor.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The invention relates to the processing and presentation of digital data that is dynamic in nature within a retrieval and processing environment that enforces control and monitors accesses made of the environment. By dynamic in nature, it is meant that the content and format of the digital data is not known until the access is received. By environment, it is meant that there exists a computer system repository of digital data wherein there are systems and methods to control and monitor digital data retrieval maintained by the repository.

The present invention is an extension of the systems and methods described by the application listed in the cross reference and as such, numerous details regarding the basis on which the present invention operates are described by that application.

Within a computer repository environment that allows for the controlled and monitored access of data contained within the repository, the format of such accesses can be qualified into three, general categories. These categories are: an access format that employs a fixed syntax; an access format that employs a fixed syntax that allows for the selection of optional parameters; and, an access format that is variable in syntax. Within this classification, the functional characteristic of the access type can be further qualified into two categories of logical operation. These categories are: requesting data held by or adding data to the repository using criteria defined by the repository; and, requesting data held by or adding data to the repository using criteria defined by the requestor.

Within the application listed in the cross-reference, the systems and methods of the first two access formats and the first category of logical operation within a controlled access repository are described. The present invention adds the capability to provide the functionality of the third access format and the second category of logical operation.

BRIEF SUMMARY OF THE INVENTION

Systems and methods are described for controlling the access, assemblage and presentation of, data maintained in a computer system repository using an access format that is variable in syntax and qualified by access criteria specified by the requestor. The present invention has particular application to computer based servers that store or maintain data with varying permission requirements and provide access to such data to a plurality of requesters. The present invention overcomes the deficiencies of prior schemes, which are described by the related application listed in the cross-reference, attempting to process requestor criteria in variable formats. This is achieved by allowing the repository designer to create one or more rule sets, which are utilized by the repository, in interpreting criteria and formats supplied by the requestor at the time of the access. The repository designer creates a single rule set by constructing a file denoted herein as a "notational fragment". Using the functionality provided by the notational fragment, it becomes possible to process and assemble requests and responses dynamically into presentations or storage organizations that have not been specifically pre-described. These dynamics allow the repository designer to maintain control over content held by the repository in the event a requestor provides processing criteria or formats whose specific behavior cannot be anticipated or accommodated by the set of criteria or formats defined by the repository.

The invention implements a notational fragment using the concept of an "interface set". The interface set is a collection of symbols that identify instructions available to the repository. The behavior of these instructions during the operation of the repository is variable; depending on the format and criteria of the access supplied by a client or other prior art system. The interface set is novel in that it permits the repository to interact with a client or a prior art system that is not necessarily bounded by the restraints imposed on the repository by the designer. In this manner, unbounded accesses and methods can be incorporated under the control mechanisms established for the repository without requiring modification to such accesses or methods.

DETAILED DESCRIPTION OF THE INVENTION

In the following detailed description of the systems and methods of the present invention, numerous specific details of an exemplary embodiment are set forth in order to provide a through understanding of the systems and methods of the present invention. It will be obvious to those skilled in the art to which this invention pertains that the present invention may be practiced without these specific details. In other instances well-known methods, procedures, components and circuits have not been described in detail to avoid unnecessarily obscuring aspects of the present invention.

Within the systems described by the cross-referenced application for controlling access to data in a repository, content that is bounded by the methods of those systems is divided into groups, each group represented by a file denoted as a "fragment". The systems and methods of the cross-referenced application qualify fragments by type, each type having specific properties of structure and operational behavior. In this embodiment of the present invention, a description of a new fragment type is provided. This fragment type is denoted as a "notational type fragment". A notational type fragment allows for the creation of any fragment type described by the cross-referenced application with the added capability of being able to substitute data occurring within fragment content, with alternates. These substitute values are not known at the time the notational fragment is created.

Figure 1:
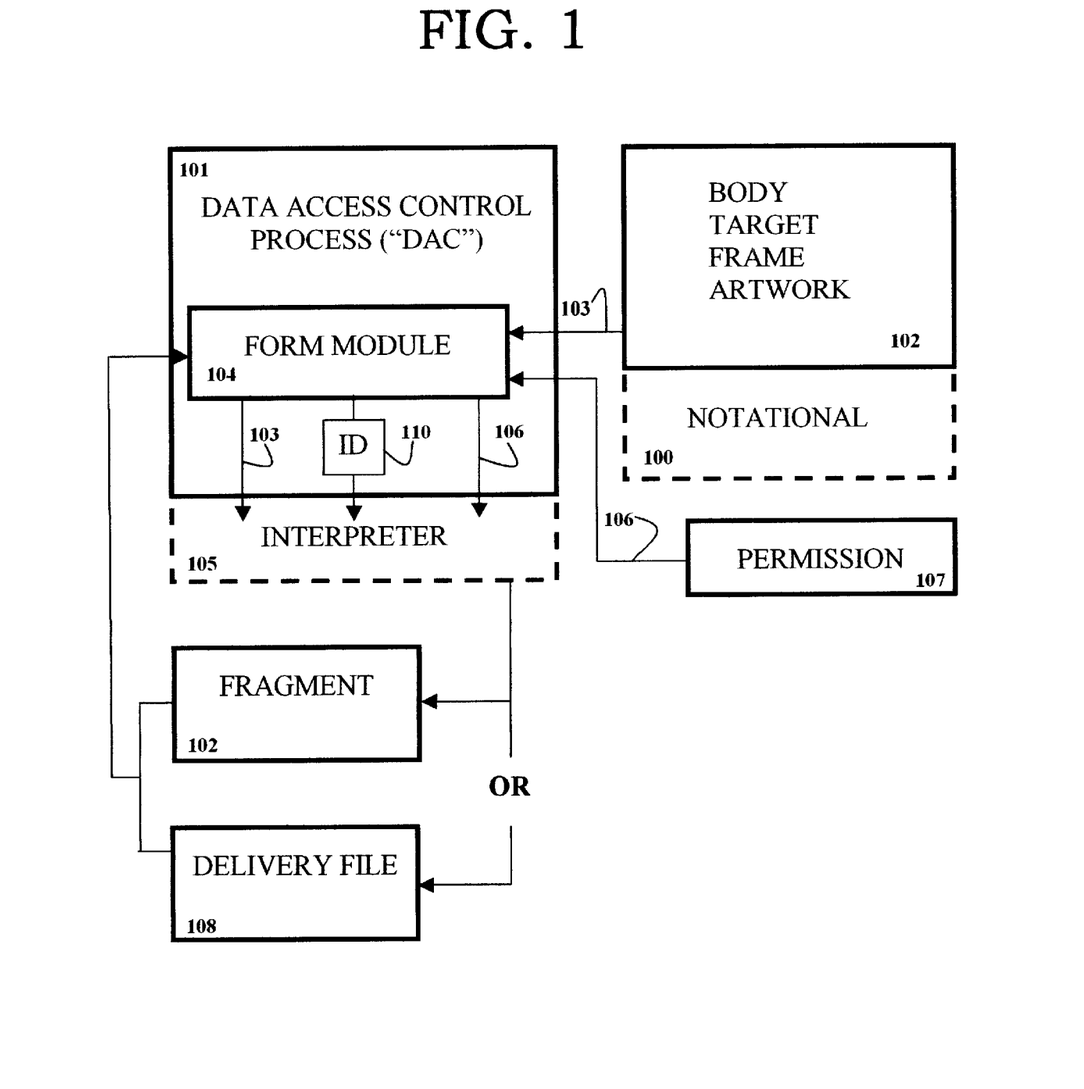
FIG. 1 is a block diagram illustrating an exemplary environment used by the present invention. The relationships existing between data structures of the present invention and the systems and methods of the cross-referenced application are shown.

With regard to FIG. 1, an exemplary relationship of the method and process of a notational type fragment 100 to the DAC 101 and fragment types 102 is depicted. The DAC 101 is a process described by the cross-referenced application. If the argument value 103 indicates a notational type fragment 100, the form module 104 component of the DAC 101 invokes a discrete process denoted as the "interpreter" 105. The interpreter 105 is defined by and novel to this preferred embodiment of the current invention. The form module 104 also accepts a second input argument 106 that conveys the level of privilege 107 assigned to the use of the notational type fragment 100. Upon completion of its process and method, the interpreter 105 will return a result in one of two formats. One format represents the structure of a fragment 102 and the second format, describing a delivery file 108. Both structures are described by the cross-referenced application.

Inputs 103, 106 received by the form module 104 are supplied to the interpreter 105 when it is invoked. The form module 104 supplies an additional input argument 110 that identifies it. If the interpreter 105 does not recognize the identifier 110 by comparing it to entries in a list exclusive to the interpreter 105, the interpreter 105 returns without producing a result 102, 108. The interpreter 105 obtains a list of valid identifiers from the repository designer through a user interface, such a list being provided before the first invocation call of the interpreter 105 by the form module 104. The method of the present invention is not dependent on the value assigned to an identifier 110.

Figure 2:
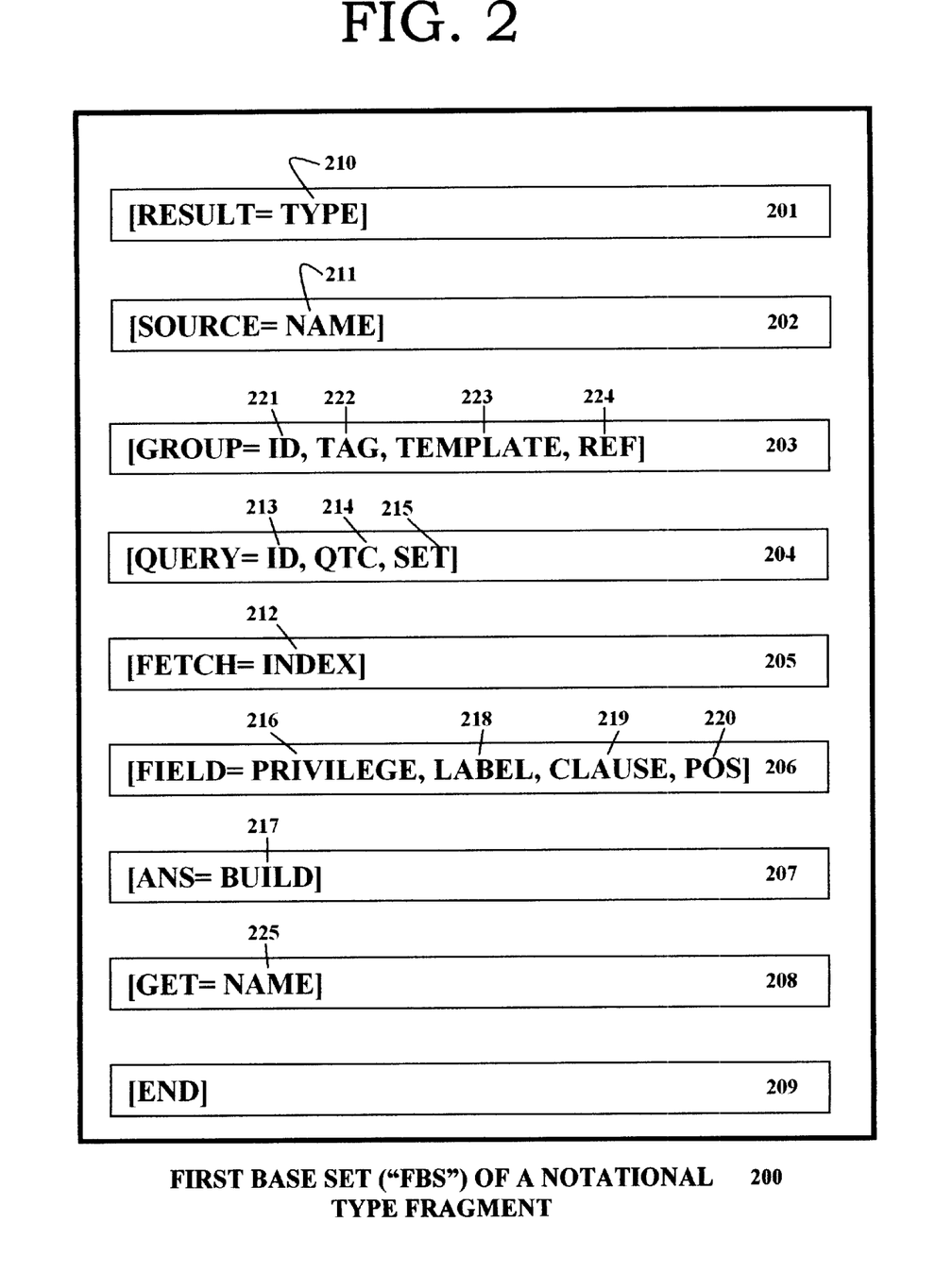
FIG. 2 is a block diagram depicting symbols that belong to the First Base Set ("FBSS").

The output created by the interpreter 105 depends on the appearance order and interpretation of symbols unique to the coding syntax of a notational type fragment 100. This coding syntax defines a symbol as being a finite character sequence, the set of character sequences denoted herein as the "interface set". The interface set is composed of one or more "base sets", with each base set being uniquely enumerated. In this embodiment of the present invention, symbols contained within one base set are prohibited from appearing as symbols in another base set. The symbols 201–209 shown in FIG. 2 are members of the "first base set" ("FBS") 200. The FBS 200 is enumerated as one (1) in this embodiment of the present, invention. The FBS 200 is an exemplary subset of the interface set and defines what is minimally required to implement a notational type fragment 100 using the interface set.

Each FBS symbol 201–209 is uniquely associated with an "instruction sequence". When an FBS symbol 201–209 is recognized, the interpreter 105 fetches the particular instruction sequence associated with that symbol and executes it. In this preferred embodiment of the present invention, an instruction sequence is a software function, suitable for run-time invocation on the system on which the DAC 101 and the interpreter 105 execute.

Figure 3:
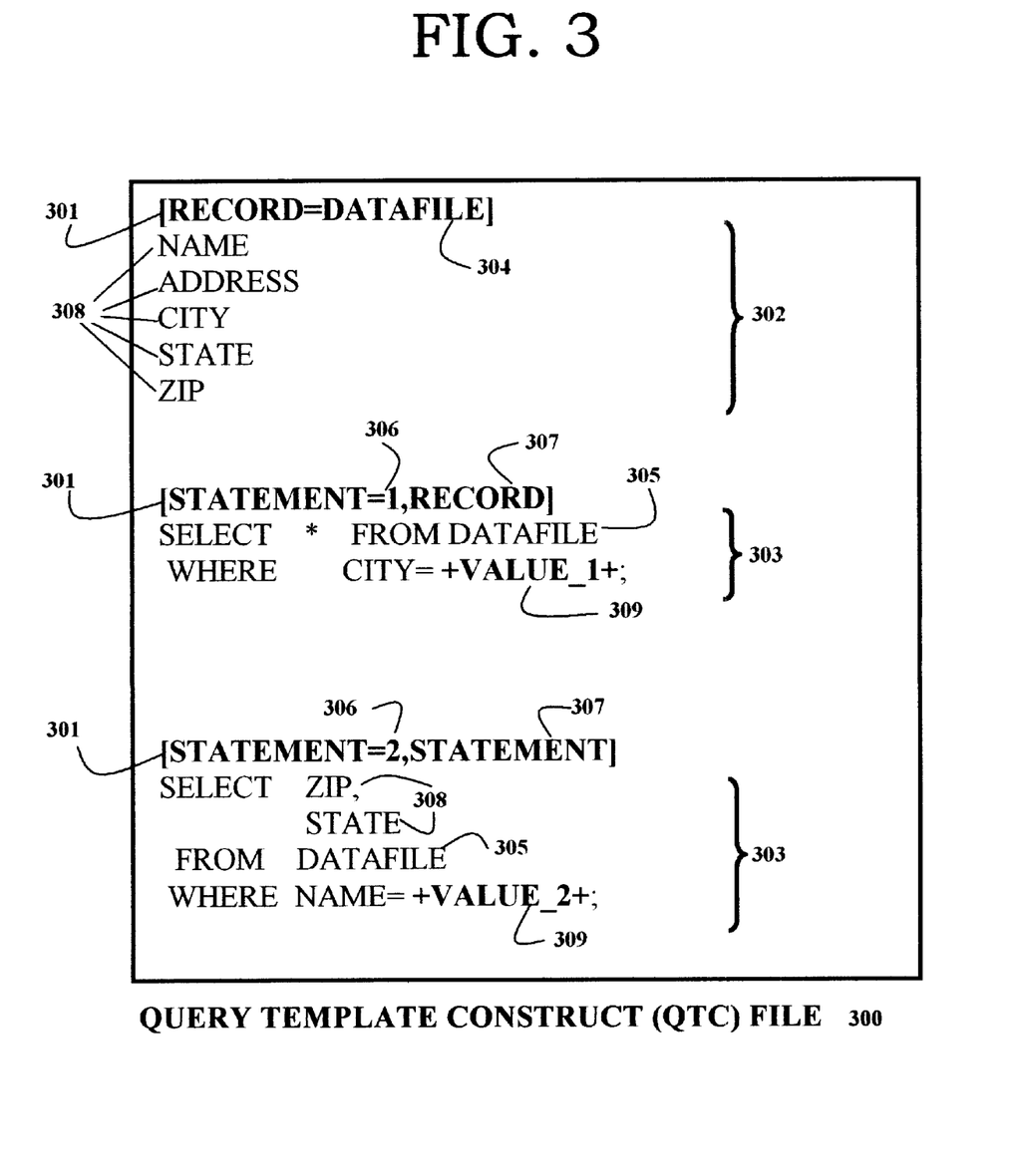
FIG. 3 is a block diagram of the major components of a Query Template Construct ("QTC") file.

The interpreter 105 is additionally capable of recognizing a second symbol set as input. These symbols are finite character sequences and reside within a file construct novel to the present invention. This file is not a fragment 100,102 and is denoted as a "query template construct" ("QTC", pronounced as "cutesy"). When the interpreter 105 is executing in conjunction with the DAC 101, the interpreter 105 expects to find files of this type co-located with content that is controlled and monitored by the DAC 101. An exemplary QTC file 300 and its content are depicted in FIG. 3. The symbols contained within a QTC 300 represent header labels 301, record declarations 302, data field markers 309; and, one or more statements 303. In a QTC file 300, the interpreter 105 accepts symbols coded in language syntax required by the datasource identified in the "SOURCE" symbol 202. Symbols that represent language syntax required by the datasource do not resolve to instruction sequences used by the interpreter 105. A header label 301 separates the content of the QTC 300 into "sections" and provides for identification of the sections. A section may be either a record declaration 302 or a statement 303. If a header label 301 identifies a section containing a record declaration 302, the value of the record name 304 field within the header label 301 must correspond to a data origin 305 identified within a statement 303 occurring within the same QTC file 300. If the header label 301 identifies a section containing a statement 303, the statement identity 306 equates to a unique, positive integer by which the statement 303 is identified. Additionally, header labels 301 that identify sections containing statements 303 use a flag value 307 to indicate if the statement 303 should be associated with a section containing a record declaration 302. If this condition is indicated, the statement 303 is interpreted as returning a result from the datasource whose format will match the description declared within the section containing the referenced record declaration 302. If the condition is not indicated, the statement 303 must include in its syntax, all record fields required of the origin 305 that will be referenced by executing "FIELD" symbols 206 contained with the notational type fragment 100 that has a reference to the QTC file 300. In this preferred embodiment of the current invention, a statement 303 is written using the syntax of the Structured Query Language ("SQL"), which exists as prior art and is a well-known method for expressing data requests.

A record declaration 302 provides a description of a "record" that is valid for use with the datasource. The declaration 302 is a listing by name, of the individual fields 308 that structurally compose a single, exemplary record returned or accepted by the datasource using the origin 305 identified by the record name 304. Record field 308 names used within a declaration 302 must be recognizable by the datasource as being valid for the origin 305 to which they are associated and, must be listed in the order in which the origin 305 represents them. A datasource is not restricted to returning records one at a time. The set of one or more records returned by a datasource is denoted as a "record set".

A "data field marker" 309 is a syntactical construct used to facilitate the mapping of fields 308 to locations within fragments 102. A data field marker 309 delineates the location within a fragment 102 at which a value substitution will occur as a result of interaction with the datasource. In this embodiment of the present invention, a data field marker 309 is not valid for use within a record declaration 302.

With respect to FIG. 2, the method of each instruction sequence associated with symbols of the FBS 200 is further explained. The "RESULT" symbol 201 identifies to the interpreter 105 the type of result 102, 108 that is to be created and must be the first declaration within a notational type fragment 100. The "TYPE" parameter 210 contains one of two values. One value indicates that a fragment 102 type will be created, the other, to indicate a delivery, file 108 type output. The methods of the present invention do not guarantee that all, possible notational type fragment 100 constructs will generate a valid result 102, 108. In this embodiment of the present invention, by valid, it is meant that the result 102, 108 has a content composed of HTML that is consistent with the intended result 102, 108. In this preferred embodiment of the present invention, the methods of the interpreter 105 guarantee that individual HTML tags created by the interpreter 105 and written to a result 102, 108 will be syntactically correct. The context scope of a "RESULT" symbol 201 is to the file end of the notational type fragment 100.

The "SOURCE" symbol 202 identifies to the interpreter 105 a prior art or well-known method with which the interpreter 105 will exchange data. This prior art method is denoted herein as the "datasource" and is identified by the value of the "NAME" parameter 211. In this preferred embodiment of the current invention, this prior art method is a process that conforms to the Open Database Connectivity ("ODBC") protocol, which is a well known, de facto standard method for exchanging data. Use of the "SOURCE" symbol 202 within a notational type fragment 100 is optional, however, only one "SOURCE" symbol 202 is allowed per notational type fragment 100. If used, the "SOURCE" symbol 202 must follow the "RESULT" symbol 201 with no intervening symbol declarations. The context scope of a "SOURCE" symbol 202 is to the file end of the notational type fragment 100.

With respect to FIGS. 2 and 3, the "GROUP" symbol 203 identifies the origin 305 and processing context of a record set returned by a datasource. The "ID" parameter 221 contains a value that assigns a unique identity to the "GROUP" symbol 203. In this preferred embodiment of the present invention, this value is expressed as a positive integer. The "TAG" parameter 222 contains the identity of the origin 305. The value of this parameter 222 must match a record name 304 or be equal to a statement identity 306. If the parameter 222 references a record name 304, the record name 304 must match at least one origin 305 declaration in which the header label 301 for that section has a flag 307 whose value is equal to a specific mnemonic character sequence. In this preferred embodiment of the present invention, this mnemonic is equal to the character sequence "RECORD". If the parameter 222 references a statement identity 306, the value of the statement identity flag 307 contained within the header label 301 must specify a value equal to a specific mnemonic character sequence. In this preferred embodiment of the invention, this mnemonic is equal to the character sequence "STATEMENT".

Figure 4A:
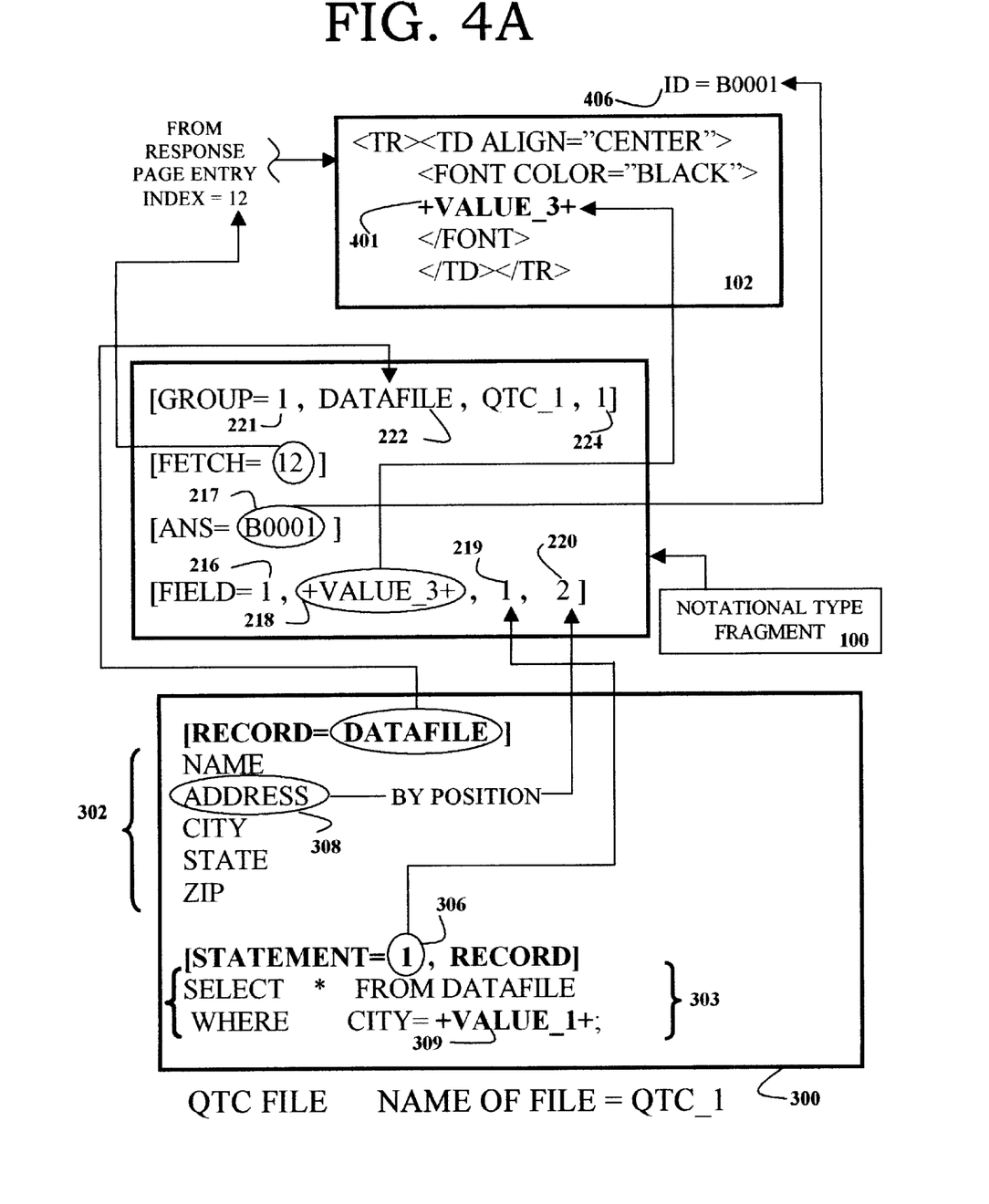
FIG. 4A is a block diagram illustrating the major components of a notational type fragment. Shown is the relationship to a QTC file; and, systems and methods of the cross-referenced application when input is accepted from an access made of the repository.

FIG. 4A illustrates an exemplary relationship of a "GROUP" symbol 203 to a record declaration 302. In the instance depicted by FIG. 4A, all "FIELD" symbols 206 that occur within the context scope of a "GROUP" symbol 203 must in their "CLAUSE" parameter 219, reference a statement identity 306 whose associated flag 307 contains the mnemonic character sequence "RECORD". In addition, the statement 303 qualified by the header label 301 whose identity 306 is the value of the "CLAUSE" parameter 219, must reference an origin 305. In this embodiment of the current invention, the explicit value of the origin 305 must be equal to the value of the "TAG" parameter 222 of the "GROUP" symbol 203 that has the current scope.

Figure 4B:
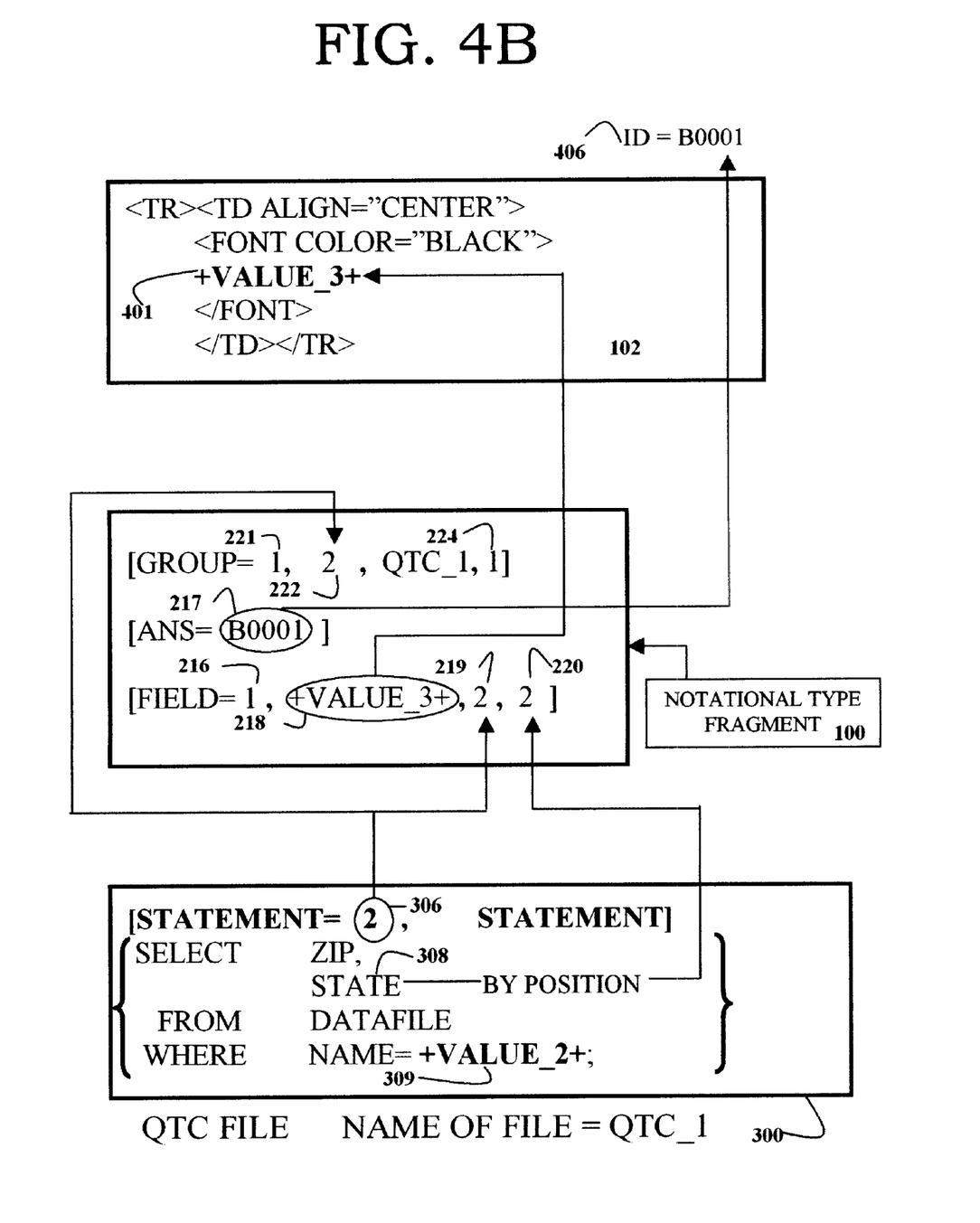
FIG. 4B is a block diagram illustrating the major components of a notational type fragment. Shown is the relationship to a QTC file; and, systems and methods of the cross-referenced application when content is obtained from a datasource using a record format.

FIG. 4B illustrates an exemplary relationship of a "GROUP" symbol 203 to a statement 303. In the instance depicted by FIG. 4B, all "FIELD" symbols 206 that occur within the context scope of a "GROUP" symbol 203 must in their "CLAUSE" parameter 219, refer to the statement identity 306 specified by the "TAG" parameter 222. The identity of the QTC file 300, in which the record declarations 302 or statements 303 appear, is placed as the value of the "TEMPLATE" parameter 223.

In the instances depicted by FIGS. 4A and 4B, the "REF" parameter 224 allows for the creation of a logical set whose members are non-contiguous "GROUP" symbols 203 referencing the same data origin 305. In this preferred embodiment of the current invention, this is achieved by using the same positive integer as a value of the "REF" parameter 224 for all "GROUP" symbols 203 that will be members of a given set.

At least one "FETCH" 205 or "ANS" 207 symbol must follow a "GROUP" symbol 203, themselves; followed by one or more "FIELD" 206 symbols. A "GROUP" symbol 203 may appear anywhere after a "SOURCE" symbol 202, subject to the placement constraints imposed by other symbols in the interface set. The "GROUP" symbol 203 establishes a context scope that is terminated by a subsequent "GROUP" 203 or "QUERY" 204 symbol, the end of a "QUERY" symbol 204 context scope marked by an "END" symbol 209 or, the file end of the notational type fragment 100.

The "QUERY" symbol 204 provides the repository designer with the capability of constructing dynamic requests for data from the datasource. The "ID" parameter 213 value uniquely identifies the "QUERY" symbol 204. In this preferred embodiment of the present invention, this value is a positive integer. The "QTC" parameter 214 specifies the name of a QTC file 300. When the interpreter 105 is executing, the location of a QTC file 300 is co-location with content that is controlled and monitored by the DAC 101. The "SET" parameter 215 allows for the logical grouping of non-contiguous "QUERY" symbols 204 that reference the same origin 305. Additionally, a "QUERY" symbol 204 cannot appear in a notational type fragment 100 without a "FETCH" symbol 205 appearing immediately after it and a "SOURCE" symbol 202 being declared at some point before it. A "QUERY" symbol 204 establishes a context scope that is terminated by an "END" symbol 209 or the file end of the notational type fragment 100.

The "FETCH" symbol 205 is used to identify content that will be retrieved when the notational type fragment 100 is processed by the interpreter 105. The "INDEX" parameter 212 is completed with the identifier of the desired content. The order in which "FETCH" symbols 205 appear is the order in which content will be accessed and processed into a result 102, 108. The permission value 107 will be applied to all content retrieved using the "INDEX" parameter 212. In this preferred embodiment of the present invention, it is not valid to nest HTML form declarations within content using multiple "FETCH" symbols 205 although it is permissible to include multiple HTML form declarations sequentially. A "FETCH" symbol 205 establishes a context scope that is, terminated by a "QUERY" 204, "GROUP" 203, "END" 209 or "FETCH" 205 symbol or, the file end of the notational type fragment 100.

The "FIELD" symbol 206 has two distinct applications within a notational type fragment 100. The first, is within the scope of a "QUERY" symbol 204, in which the "FIELD" symbol 206 provides the means to associate data fields in an HTML form with data field markers 309 contained within a statement 303. In its second application it appears within the scope of a "GROUP" symbol 203 declaration. In this instance, the "FIELD" symbol 206 provides for content control of data delivered from a datasource.

Figure 4C:
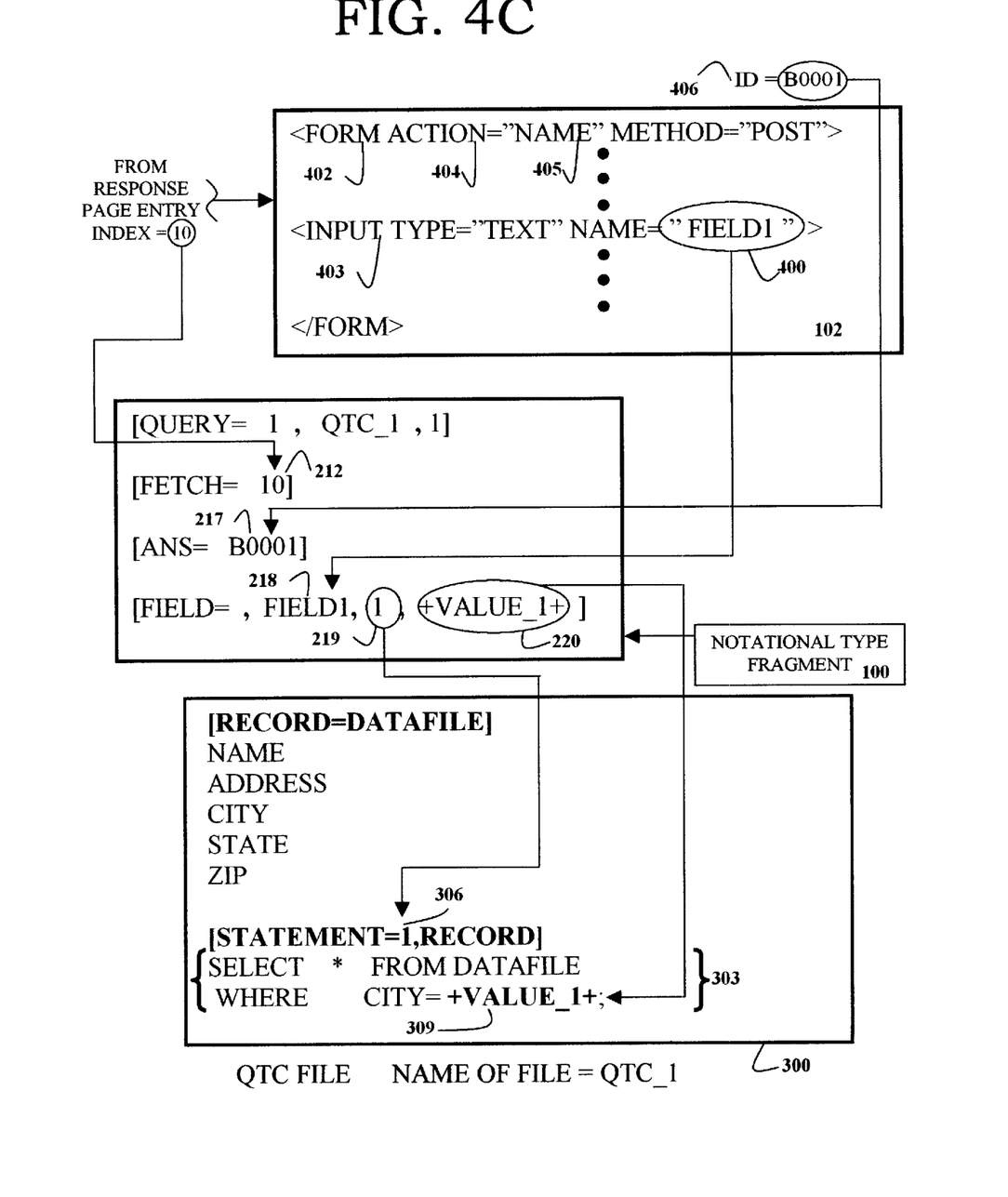
FIG. 4C is a block diagram illustrating the major components of a notational type fragment. Shown is the relationship to a QTC file; and, systems and methods of the cross-referenced application when output is obtained from a datasource in statement format.

In the first context, illustrated by an exemplary depiction in FIG. 4C, the "PRIVILEGE" parameter 216 is ignored. In this context, the DAC 101 provides permission requirements by allowing the interpreter 105 access to permission information. This access is in the form of shared data resources and becomes active when the interpreter 105 makes a request for it. In this preferred embodiment of the present invention, the interpreter 105 cannot alter the permission values shared by the DAC 101. The format of the permission values shared by the DAC 101 is described by the cross-referenced application. Referencing content by processing "FETCH" 205 and "ANS" symbols 207 causes a lookup and validation of permission. The "LABEL" parameter 218 identifies a field 400 occurring within content referenced by the "ANS" 207 that has scope. This field 400 contains the "source value". In this preferred embodiment of the current invention, this field 400 is one that permits data entry as described by the syntax of HTML.

The "CLAUSE" parameter 219 specifies the statement identity 306 of the section containing the desired statement 303. The "POS" parameter 220 identifies the data field marker 309 within the statement 303 into which the source value 400 will be placed.

In the second context, illustrated by exemplary depictions in FIGS. 4A and 4B, the "PRIVILEGE" parameter 216 specifies the privilege level required to receive the value of the field 308 returned by the datasource. The repository designer, through a user interface, sets the value of this parameter 216 during the creation of a notational type fragment 100. The value 106 passed as an argument to the interpreter 105 by the form module 104 is used in comparison with this parameter 216 to determine the validity of the permission 107.

Continuing with the description of the second context and with respect to FIGS. 4A and 4B, the "LABEL" parameter 218 contains the identity of the data field 401 using the value of the data field marker 309. The "CLAUSE" parameter 219 specifies the identity 306 of the desired statement 303. Lastly, and again within this context, the "POS" parameter 220 identifies the position of a field within a record returned by the datasource. In the form depicted in FIG. 4A; this value is equivalent to the position of the field 308 within a data declaration 302. In the form depicted by FIG. 4B, this value is equivalent to the position of the field 308 within a statement 303. In both instances and for this preferred embodiment of the present invention, the values are expressed as positive integers. The privilege requirement 216 assigned to a field 308 in a record declaration 302 or statement 303 is applied to all occurrences of the actual field returned by the datasource that are associated with the declared field 308. "FIELD" symbols 206 are valid only if they appear following an "ANS" symbol 207. A "FIELD" symbol 206 does not create a context scope except unto itself.

The "ANS" symbol 207 identifies a fragment 102. The identity 406 of the desired fragment 102 is used as the value of the "BUILD" parameter 217. The "ANS" symbol 207 establishes a context scope that is terminated by a subsequent "ANS" 207, "GROUP" 203 "FETCH" 205 or "QUERY" 204 symbol, the end of a "QUERY" symbol 204 context scope marked by an "END" symbol 209 or, the file end of the notational type fragment 100. Further, the "ANS" symbol 207 may be used in one of two ways when specified after a "GROUP" symbol 203. These two methods are depicted by the exemplary declarations illustrated in FIG. 5.

Figure 5:
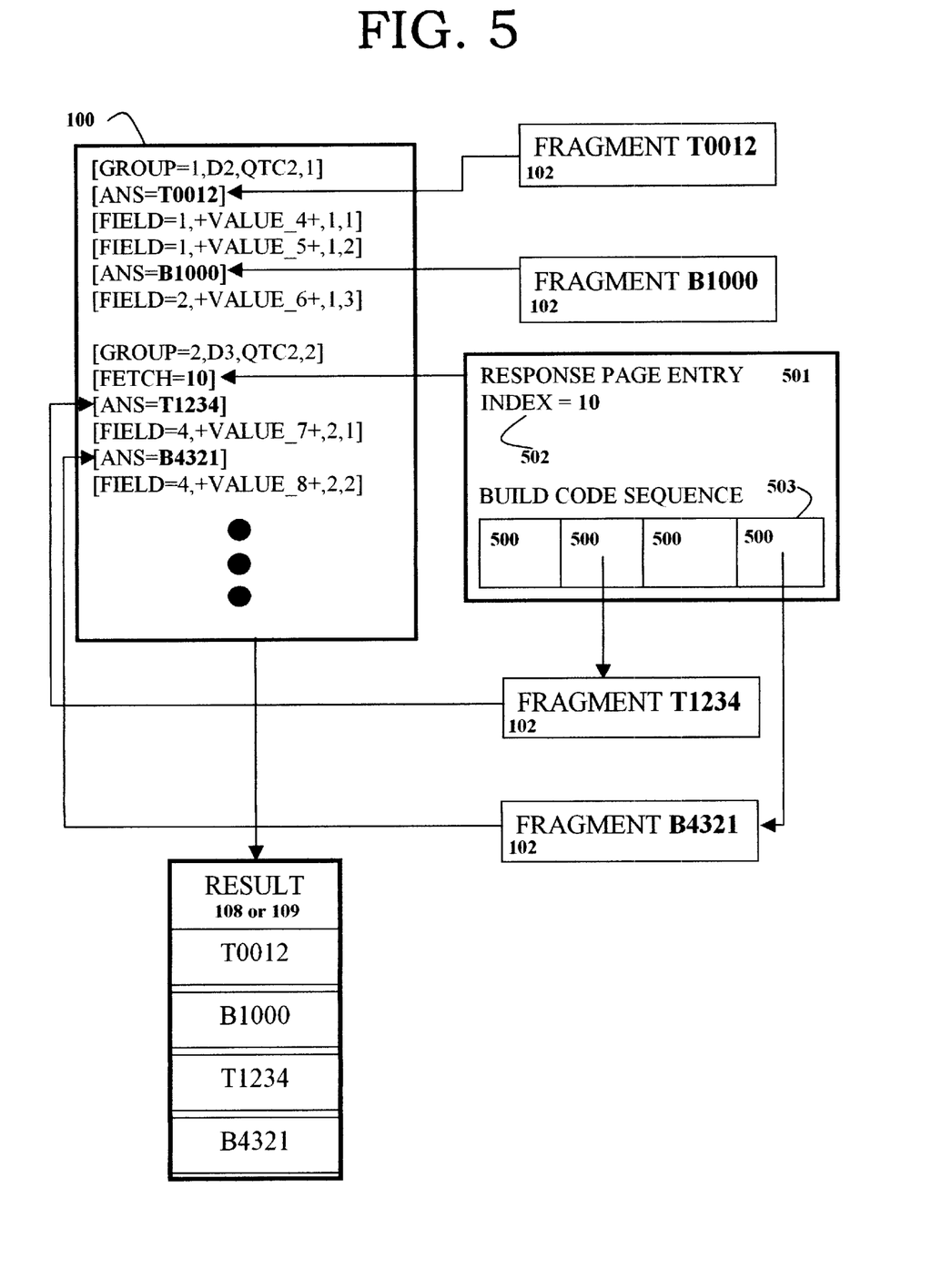
FIG. 5 is a block diagram illustrating how parameter values of symbols contained within a notational type fragment are resolved to values contained in systems and methods of the cross-referenced application.

With respect to FIG. 5 and in the first section, when an "ANS" symbol 207 is used after a "GROUP" symbol 203 without an intervening "FETCH" symbol 205, the value of the "BUILD" parameter 217 may specify the identity 406 of any fragment 102 suitable for use with "FIELD" symbols 206. By suitable it is meant that the fragment 102 is not a notational type fragment 100. The fragment 102 so identified will be used for all subsequent "FIELD" symbol 206 processing until the context scope of the "ANS" 207 or "GROUP" 203 symbol ends. In the second section, when a "FETCH" symbol 205 precedes an "ANS" symbol 207, it establishes a scope in which all "ANS" symbols 207 within that context must reference a fragment 102 that is an member 500 of the sequence 503 identified by the "INDEX" parameter 212. As before, any fragments 102 obtained from the sequence 503 must be suitable.

The "GET" symbol 208 allows the interpreter 105 to include the contents of "external" files within the result. External files are defined in the cross-referenced application and generally either exist outside the control and monitoring of the DAC 101 or do not require use of a datasource. The "NAME" parameter 225 fully qualifies the identity of the external file. "GET" symbols 208 do not influence the processing of other symbols from the interface set with one exception. A "GET" symbol 208 may not appear between the declarations of a "RESULT" 201 and a "SOURCE" 202 symbol. Positioning of external file contents referenced by a "GET" symbol 208 within the result 102, 108 is determined by the position of the "GET" symbol 208 within the notational type fragment 100. In this embodiment of the present invention, the external file referenced by a "GET" symbol 208 may not contain data field markers 309. The "GET" symbol 208 does not establish a context scope except unto itself.

The "END" symbol 209 terminates the context scope of a "QUERY" symbol 204. In this embodiment of the present invention, the context scope of a "QUERY" symbol 204 must be terminated before another "QUERY" symbol 204 may be declared.

Figure 6:
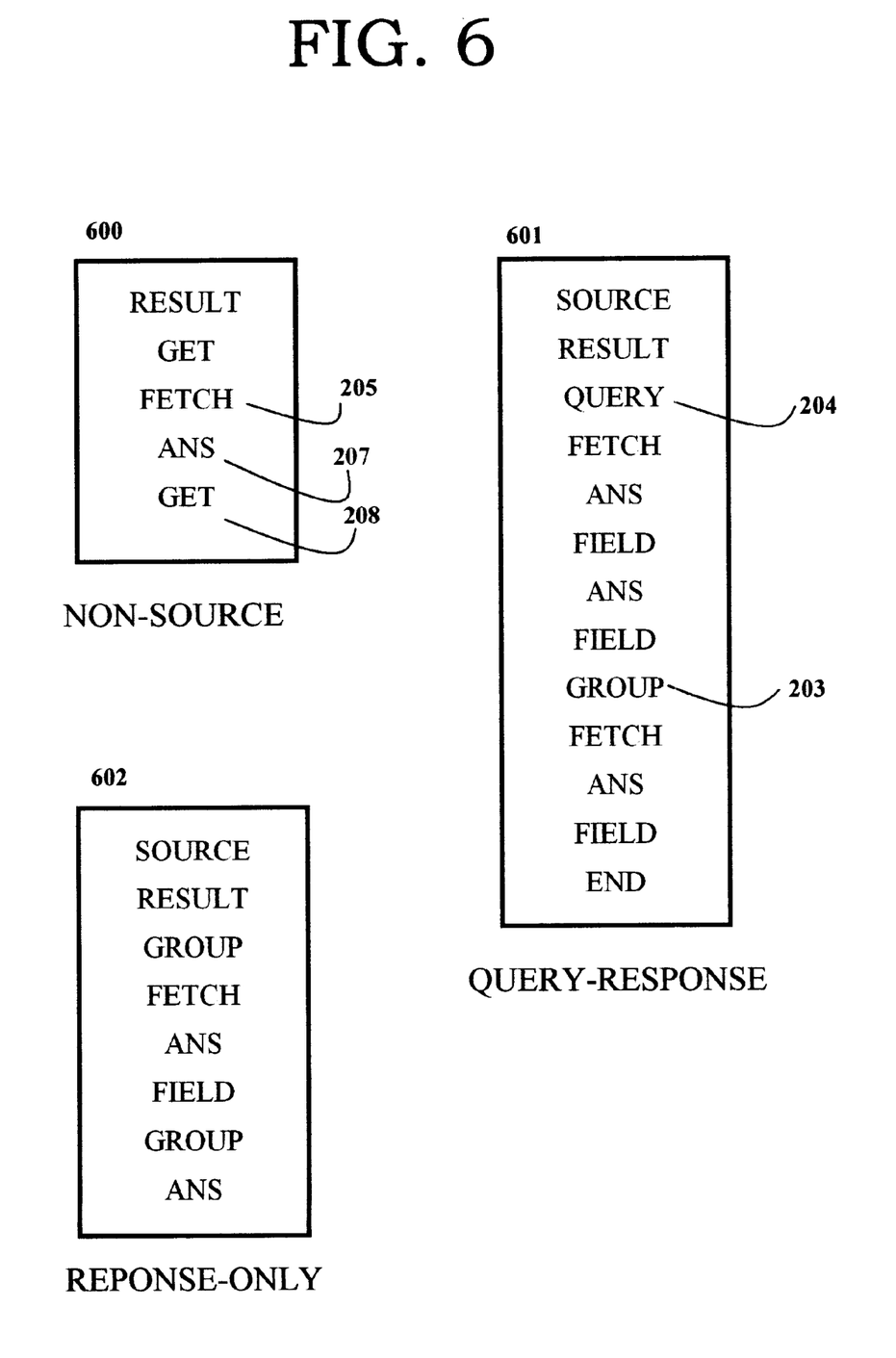
FIG. 6 is a diagram depicting the three general forms of a notational type fragment, each showing exemplary symbol use.

The interpreter 105 permits three generalized formats of a notational type fragment 100. FIG. 6 is an exemplary depiction of these formats. These formats are denoted herein as "non-source" 600, "query-response" 601 and "response-only" 602. In FIG. 6, FBS symbols 200 are depicted without their parameter lists and this is done for illustration simplicity only. It should not be inferred from the drawing that the generalized formats 600–602 use interface set symbols while failing to include parameters that are a part of the interface set symbol's syntax. Each of these formats in their result 102, 108 form and the data content they reference, are co-located with content that is under the control and monitoring of the DAC 101. The actual content of a notational type fragment 100 or a QTC file 300 is never used as part of a response to a requestor, within the meaning of response and requestor as defined by the cross-referenced application.

In the non-source format 600, the interpreter 105 will allow the inclusion of "FETCH" 205, "ANS" 207 and "GET" 208 symbols that do not reference H form constructs 402 or data fields 401, 403.

In the query-response format 601, and in this embodiment of the current invention, the interpreter 105 requires that a datasource as represented by a "QUERY" symbol 205, be an element of content that is controlled by the DAC 101. This is accomplished by declaring at least one "GROUP" symbol 203 within the context scope of the "QUERY" symbol 204. If multiple "GROUP" symbols 203 appear, the output produced by processing each symbol is combined to form the result 102,108 in the order the symbols are declared within the notational fragment 100. If multiple "QUERY" symbols 205 appear within this format, they must appear in a sequential, contiguous order prior to the first occurrence of a "GROUP" symbol 203.

In the response only format 602, the result 102, 108 is generated by combining the results of each "GROUP" symbol 203 in the order in which the symbols are declared within the fragment 100.

To create a notational type fragment 100, the repository designer must initially choose those datasources that will be used and the permission levels that will apply to such use. With these decisions made the designer, through a user interface, creates the QTC files 300 necessary to implement the design, assigning each QTC file 300 a unique name. When creating a design page 700, which is a data structure defined by the cross-referenced application, whose constituent fragments 102 will be referenced by a notational type fragment 100, the designer must structure the design page 700 according to one of the general formats 600–602. This means that when disassembled into fragments 102, the content of the design page 700 must correspond to the accepted layout of symbols 201–210 used within the chosen format 600–602. The methods of the present invention do not prohibit the use of existing, disparate design pages in the creation of a notational fragment 100, subject to the rules of interface symbol set usage. In this preferred embodiment of the present invention, all result forms 102, 108 must represent valid HTML in syntax and context before being permitted to be content controlled and monitored by the DAC 101.

Figure 7:
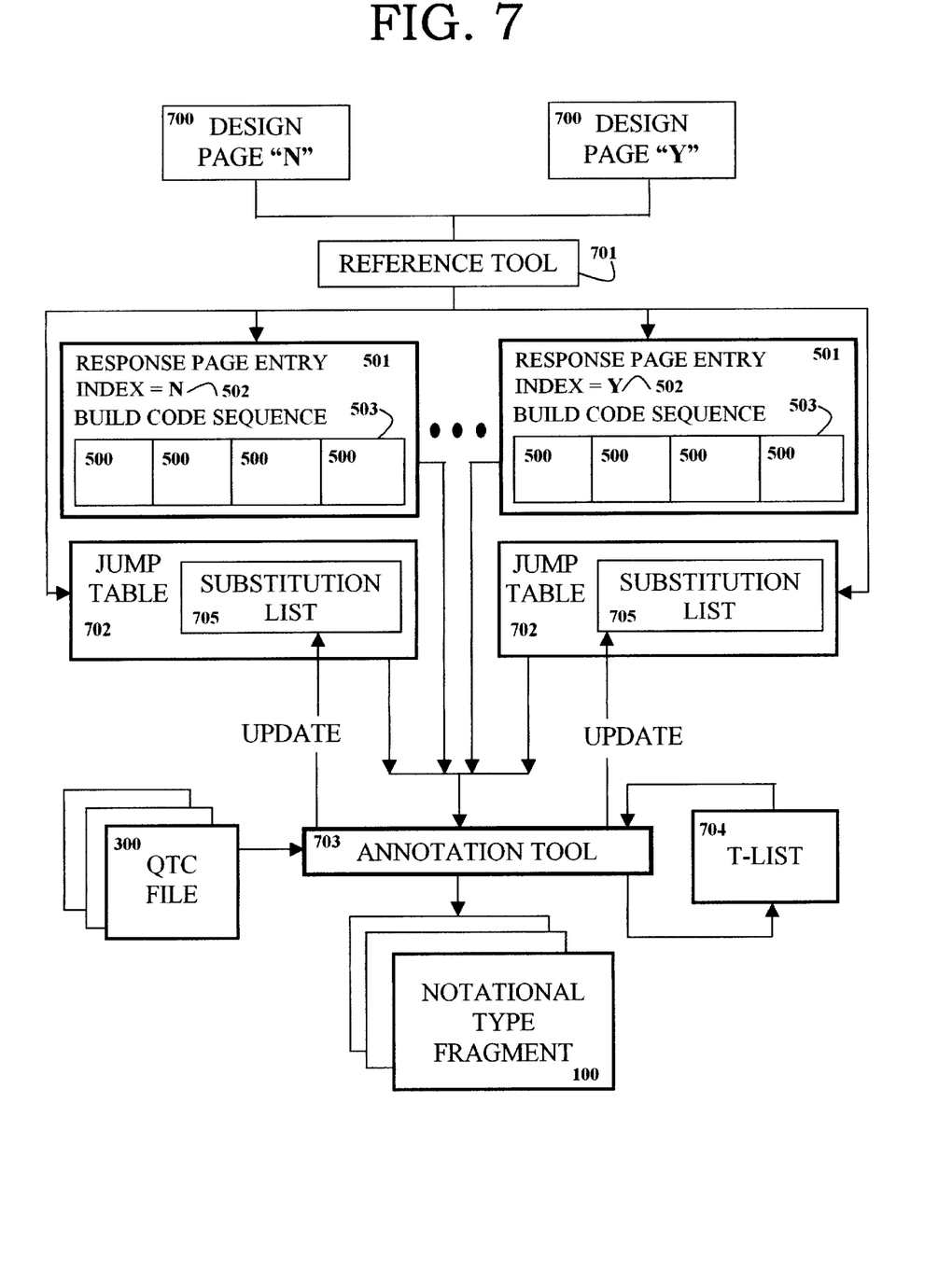
FIG. 7 is a block diagram illustrating the relationship existing between the annotation tool, data structures of the present invention; and, values obtained from s stems and methods of the cross-referenced application.

With respect to FIG. 7, creation of a notational type fragment 100 is accomplished using a two step process. In the first step, the designer performs a layout and design of a result 102, 108 creating it using the format of a design page 700. All such layouts are processed using the reference tool 701, a system that is described by the cross-referenced application. The reference tool 701 produces the response page entry 501 and jump table 702 for each design page 700. Using the "annotation tool" 703, which is a standalone set of processes and methods executed on a computer system that is typically not the system utilized by the DAC 101 and the interpreter 105, the identifier of the design page 700, a reference to the response page entry 501 and jump table 702; and, the QTC files 300 are accepted as input. Starting at the reference tool 701 step, this process is repeated for each design page 700.

Through a user interface, the designer must indicate the format 600–602 expected from each set of inputs to the annotation tool 703. With the receipt of this information, the tool 703 creates a temporary list 704, denoted herein as the "t-list". Each entry in the list 704 is initially created with three fields. The first field contains the identifier of the original design page 700, the value of the second field is a reference to the response page entry 501, and the third field contains the format 600–602 type value. Entries in the t-list 704 facilitate the method by which the annotation tool 703 relates the format 600–602 type to each response page entry 501.

When creating design pages 700 for use in notational type fragments 100, a designer must account for two further considerations. The first of these pertains to HTML form usage. With respect to FIG. 4A, when an HTML form is specified 402, the designer does not specify the actual object 405 of the reference 404 used by a requestor when the form is executed. Instead, the object 405 is completed using a unique name created by the designer. This name is used in a later step. In this instance, the annotation tool 703 will not update any entry in the substitution list 705 for the reference 404. The substitution list 705 is a data structure described by the cross-referenced application. With respect to FIGS. 4A, 4B and 4C, the second consideration applies to syntax that permits data entry 403 or the placement of data 401. Each such field 401,403 created by the designer must be identified using a name that is unique. A field 401,403 name must be declared in the HTML construct that implements the field 401,403.

In this preferred embodiment of the present invention, the annotation tool 703 will process all non-source formats 600 first, followed by all response-only formats 602 and concluding with all query-response 601 formats. If a particular format has no entry within the t-list 704, the tool 703 proceeds to the next format type 600–602.

For non-source formats 600, the tool 703 prompts the designer through a user interface for the result type 600 and constructs a "RESULT" symbol 211. For each response page entry 501 identified by an entry in the t-list 704, the tool 703 will generate a "FETCH" symbol 206 placing the entry index 502 as the value of the "INDEX" parameter 215. The designer then reviews the build code sequence 503 of the selected entry 501. Through a user interface, the designer indicates to the tool 703 those build codes 500 to be used within the notational type fragment 100. For each build code 500 selected, the tool 703 will generate an "ANS" symbol 208 placing the identifier of the build code 500 as the value of the "BUILD" parameter 220. In this preferred embodiment of the present invention, the tool 703 creates a new file into which it writes symbols selected from the FBS 200. This new file will become the notational type fragment 100. By examining a directory list provided to it by the reference tool 701, the annotation tool 703 assigns the file a unique build code 500 identifier. The annotation tool 703 creates a build code 500 value in the same manner as the reference tool 701 with the exception that a unique value is used to identify the notational type. The concept and naming method of a build code 500 are described by the cross-referenced application. In this embodiment of the present invention, the tool 703 then allows the designer the option to select alternate response page entries 501 that do not appear in the list 704 and repeat the symbol generation process.

To process response-only formats 602, the tool 703 begins by accessing the t-list 704 processing each entry in turn that specifies the format 602. The response page entry 501 identified by the twist 704 entry is accessed and each fragment 102 referenced by a build code 500 within the sequence 703 is parsed for data fields 401. If any fragment 102 contains at least one data field 401, the designer is prompted for the name of the datasource. If no data fields 401 are found the annotation tool 703 restarts processing on the notational type fragment 100 as a non-source type 600. With the acquisition of a datasource, the tool 703 constructs and outputs a "SOURCE" symbol 202. Following this, the tool 703 outputs a "RESULT" symbol 201 specifying the type 602.

For each data field 401 that is encountered, and if the QTC file 300 has not already been identified, the designer is prompted by the tool 703 through a user interface, for the identity of the QTC file 300 that will associate with the fragment 102. A "GROUP" symbol 203 is created for each QTC file 300 referenced. For fragments 102 that require mote than one QTC file 300, each QTC file 300 name is supplied by the designer to the tool 703 in turn. The contents of the QTC files 300 used and the fragment 102 are then displayed to the designer. The designer proceeds to select each field 401 from the fragment 102 and pair it with a data field 308 from a QTC file 300 through a user interface. For each pairing, the reference tool 703 creates an entry in a temporary list identifying the pairing and the associated data declaration 302 or statement 303. This temporary list is then used to generate "FIELD" symbols 206, which occurs in a subsequent step. When the pairings are complete, the tool 703 generates the required symbols 201–210 to a file as described earlier in the following manner.

The tool 703 creates a "FETCH" symbol 205 if more than one selected fragment 102, as represented by a build code 500 identity, appears within a sequence 503 determined from the t-list 704 entry or as supplied by the designer, and there are no intervening fragments 102 from other sequences 503.

For each referenced build code 500, an "ANS" symbol 207 is created using the identifier of the build code 500 as the value of the "BUILD" parameter 217. Within the content referenced by a build code 500 and starting with the first field 401 encountered, the tool 703 creates a "GROUP" symbol 203 assigning it a unique identifier 221. The remaining parameters 222–224 is completed based on QTC file 300 association. The tool 703 is able to derive the correct identity values from the QTC 300 since it is known at the time of the field pairings, to which sections selected fields belong. The tool 703 prompts the designer for the privilege level of the field 401 through a user interface. This is followed by the tool's 703 creation of a "FIELD" symbol 206 establishing the relationship between the field 401 contained within the fragment 102 and the field 308 of the record declaration 302 or statement 303, as appropriate. As long as the scope of the data origin 305 identified in the "TAG" parameter 222 does not change, the tool 703 will process fields 401 in this manner. If a subsequent field 401 is associated with a data origin 305 different from that of the current "GROUP" symbol 203 context, the tool 703 ends the context of the previous "GROUP" symbol 203 and creates a new "GROUP" symbol 203 reflecting the change in origin 305. This process repeats until all field pairs have been processed. In this embodiment of the current invention, the tool 703 ensures that "FIELD" symbols 206 are maintained in the same order as the appearance order of the fields 401 from which they are created.

For a query-response format 601, the annotation tool 703 prompts the designer through a user interface, for the name of the datasource. Once obtained, a "SOURCE" symbol 202 is created with the name of the datasource coded as the value of the "NAME" parameter 211. The tool 703 then selects the desired result type 601 and a "RESULT" symbol 201 is created. A "QUERY" symbol 204 is created using the content of a QTC file 300 identified by the designer whenever a declaration of an HTML form tag 402 is encountered. The "REF" parameter 215 is not completed at this time but is left for a later step. An "END" symbol 209 is added to close the context of each "QUERY" symbol 204 created.

The tool 703 creates a "FETCH" symbol 205 if more than one selected fragment 102, as represented by a build code 500 identity, appears within a sequence 503 determined from the t-list 704 entry or as supplied by the designer, and there are no intervening fragments 102 from other sequences 503. As appropriate, the tool 703 generates "ANS" 207 and "FIELD" 206 symbols based on build codes 500 and data fields 401 referenced by the sequence 503.

In this embodiment of the present invention, the methods assume that a query of a datasource will elicit a response from the datasource. For a query-response format 601 and in order to place the data returned from the datasource, the annotation tool 703 through a user interface, permits the designer to select a response only format 602 notational type fragment 100 to act as the recipient of the data.

Before the response format 602 notational type fragment 100 is processed, the tool 703 ensures that all "QUERY" 204 contexts within the query-response format 601 fragment 100 are sequential and contiguous. In this embodiment of the present invention, when this format 601 type fragment 100 is executed by the interpreter 105, the output of all "QUERY" symbols forms the result 102, 108. As an optimization of "QUERY" symbols 204, the tool 703 examines each origin 305 referenced by a "QUERY" 204. For those "QUERY" symbols 204 that refer to identical origins 305 and have equivalent data fields 308 or, a superset of referenced data fields 308 is represented by a "QUERY" 204 in the set, the tool 703 will update each "SET" parameter 215. The "SET" parameter 215 is updated by assigning it a positive integer that will be common to all "QUERY" symbols 204 that are members of the set. For the particular "QUERY" symbol that when processed satisfies the set, the "SET" parameter is set equal to the selected integer multiplied by negative one (−1). This same process is applied in setting the "REF" parameter 224 of a "GROUP" symbol 203.

The tool 703 continues by selecting response only format 602 notational type fragments 100 whose "SOURCE" symbol specifies a value identical to the "SOURCE" symbol created for the query response format 601. The designer may select any of the notational type fragments 100 identified by the tool 703 in this manner. A copy is made of the selected fragment 100 and the "RESULT" 201 and "SOURCE" 202 symbols are removed. The remainder of the copy is then appended to the end of the query-response type 601 notational type fragment 100.

After the creation of the notational type fragment 100, the designer has three options regarding the disposition of the result 102, 108. The designer's first choice can be to instruct the tool 703 to create anew entry 501 and sequence 503 into which the build code of the notational type fragment 100 will be placed. The second option is to substitute the build code of the notational type fragment 100 for a build code already in an entry 500. The third option allows the designer to append or pre-pend the build code of the notational type fragment 100 to an existing sequence 503.

If the second option is selected, the jump table 702 entry and substitution list 705 corresponding to the original entry 500 being replaced will not be used. The jump table 702 and substitution list 705 are data structures defined and described by the cross-referenced application. If the second or third option is selected, the tool 703 ensures that a cyclical reference to the entry 501 or sequence 503 will not be created as a result of inserting the notational type fragment 100. This step examines and compares the values of "INDEX" 215 and "BUILD" 220 parameters within the notational fragment 100 to response page entry indices 502 and build code 500 identifiers. The annotation tool 703 will not install any notational type fragment 100 into a sequence 503 that would result in a reference to another element contained within the same sequence 503. In this embodiment of the present invention, n-level circular references are not examined for by the annotation tool 703.

When the DAC 101 receives a notational type fragment 100 as input, it invokes the interpreter 105. The DAC 101 determines the presence of a notational type fragment 100 based on the value of the build code 500 identifier assigned to the fragment 100. When the interpreter 105 is invoked, it performs the following.

A determination of the general format 600–602 is made by examining the first and third interface set symbols occurring within the fragment 100. If the first symbol is a "RESULT", then the general format is deemed non-source 600. If the third symbol is "QUERY" 204, then the general format is deemed query-response 601. If the third symbol is "GROUP" 203, then the general format is deemed to be response-only 602. Any other combination of symbols 201–209 causes the interpreter 105 to abandon the process and return an access violation. An access violation is a concept and structure defined by the cross-referenced application.

From the "RESULT" symbol 201, the interpreter 105 extracts the value of the "TYPE" parameter 210. If the "TYPE" parameter 210 is not valid, an access violation is generated. For all the general formats 600–602, if the result type is a fragment 102, the output returned to the DAC 101 is created solely by the notational fragment 100. If the result type is a delivery file 108, the interpreter 105 adds the necessary HTML syntax to the output in order to make the result 108 wholly complete as a delivery file. A delivery file is a structure described by the cross-referenced application.

If any symbol 201–209 is found to have faults in syntax, the interpreter abandons creation of the result 102, 108 and returns an access violation. If a "FETCH" 205 or "ANS" 207 does not properly resolve to content, the process is abandoned and the interpreter 105 returns an access violation.

If the general format is non-source 600, the interpreter 105 processes symbols 201–209 in order until the end of the notational type fragment 100.

In a query-response format 601, and in this embodiment of the present invention; the result 102, 108 being created contains at least one HTML form declaration tag 402. For each HTML form tag encountered, the interpreter 105 modifies the form declaration tag 402 by coding the DAC 101 as the object 405 of the reference 404. Additionally, the interpreter 105 adds the argument representations of a forresta and a destination. The forresta and destination arguments are data structures described by the cross-referenced application. To do this, the interpreter 105 adds two fields to the form construct. In this preferred embodiment of the present invention, these fields are coded as HTML input tags whose type is "hidden". In this embodiment of the present invention, the destination argument value is equal to the response page entry 501 that contains the notational type fragment 100 that generated the form. Within a temporary list that it maintains, the interpreter 105 makes an entry of the forresta value used in each form. The interpreter 105 continues to process symbols 201–209 until the end of the "QUERY" 204 context. The result 102,108 is returned to the DAC 101.

When a form layout returns as a response, the added fields precede the data entry fields 403 that compose the actual data content of the represented HTML form. When the form is received by the DAC 101, and with the destination argument having the value of the entry 501 that contains the notational type fragment 100, the notational type fragment 100 will subsequently be invoked. Due to the presence of the HTML form variables, the interpreter 105 begins by examining "QUERY" symbols 204 for common "SET" 215 values. Each "QUERY" symbol 204 is examined for a "SET" 215 value that is negative. If a set is detected but no negative parameter 215 value is found, an access violation is generated. When all "QUERY" 204 symbols have been processed and in the event there was no access violation, the interpreter 105 organizes the statements 303 referenced by the "QUERY" 204 symbols in a manner suitable for the datasource.

The interpreter 105 submits the QTC file 300 statements 303 referenced by "QUERY" symbols 204 occurring within the fragment 100. This is done after mapping the form variables to the record fields 308 of the statements 303. The resulting statement syntax becomes the input argument to the datasource. While the datasource is processing a request, the interpreter 105 suspends its process thread until the datasource is ready to respond. When the datasource returns, the interpreter will map record fields 308 to data value fields 401 according to the "GROUP" contexts 203 present within the notational type fragment 100. The resulting output becomes the result 102, 108 returned to the DAC 101.

In a response-only 602 general format, the interpreter 105 performs an identical operation on "REF" parameter 224 values as was done for "SET" 215 values. Continuing, the statements 303 referenced by "GROUP" symbols 203 are submitted to the datasource in a manner identical to "QUERY" symbol 204 processing. While the datasource is processing a request, the interpreter 105 suspends its process thread until the datasource is ready to respond. When the datasource returns, the interpreter will map record fields 308 to data value fields 401 according to the "GROUP" contexts 203 present within the notational type fragment 100. The resulting output becomes the result 102, 108 returned to the DAC 101.

What is claimed is:

1. In a computer system for controlling and monitoring data maintained in a data repository, such data being exchanged with a client by transmission of said data between the repository and client, comprising in combination:

repository source means from which data is obtained, said data eligible to be a component of a transmission;

means for extracting and parsing data contained within transmissions occurring between said repository means and client, said data being additionally eligible to be a component of data exchanged with and understood by said repository source means engaging in such a transmission; means for using a mnemonic notation to describe a placement order of data by its position within a transmission, said transmission occurring between said repository means and client, said notation being a set of finite character sequences specified by a designer so as to be unique from transmission content, said notation further being eligible to be used as content of a notational fragment;

means for using a mnemonic notation to describe the placement order of data by its position within a data construct created by said repository source means, said notation being a set of finite character sequences specified by a designer so as to be unique from said data, said notation further being eligible to be used as content of a notational fragment;

means for using a mnemonic notation to describe the placement order of data by its position within a data construct accepted by a repository source means, said notation being a set of finite character sequences specified by a designer so as to be unique from said data, said notation being unique from commands understood by the repository source, said notation further being eligible to be used as content of a notational fragment;

means for using a mnemonic notation to describe the placement order of current data by its position within a future transmission, said data being portions of content provided by a repository source means; and means to deny a substitution of portions of transmission content and a providing of content to said repository source means and a retrieval of content from said repository source means, said denial derived from the comparison of a privilege value specific to the transmission with said repository source means predetermined privilege value.

2. The system of claim 1, further comprising means for representing data structures used to identify transmissions and repository source means content that includes the use of said mnemonic means, said portions being to able to exist with and without a privilege value, said portions with a privilege value being eligible to have said privilege value compared to the privilege value of a notational fragment.

3. The system of claim 1, including means for interpreting said mnemonics as an interface symbol set, said set composed of at least one base set, said base set composed of at least one finite character sequence, each character sequence representing the syntax of one mnemonic symbol, said mnemonic symbol used to reference an instruction sequence, said instruction sequence being represented by computer software, said interface set being eligible to be used as content of a notational fragment.

4. The system of claim 1, further including data field marker means, said marker means being fixed in syntax and unique from the content for which said marker means substitutes, said marker means being used to identify the position of modifiable data occurring within portions of a transmission and content returned by a repository source means and content provided to a repository source means.

5. The system of claim 4, further including means to associate data field marker means used within a particular transmission with data field marker means used within a data structure understood by a repository source means.

6. The method of describing a placement order of data by its position within a transmission and within a construct that is understood by a repository source means comprising the steps of:

using mnemonic notations to describe the placement order of data by its position within a transmission and within a data construct created by said repository source means, said notations being a set of finite character sequences specified by a designer so as to be unique from said data, said notations further being eligible to be used as content of a notational fragment;

using a user interface that allows the designer to select transmissions and repository source means that will use said mnemonic notations;

parsing a format of a transmission and the format of data understood by a repository source means into a symbolic notation, said notation describing portions of said data that will be replaced;

recognizing the symbolic notation when it occurs within a transmission and when it occurs within a construct understood by a repository source means;

assigning a correspondence between mnemonic notations used within a transmission and in values accepted and returned by a repository source means;

determining and comparing privilege values assigned to specific transmissions and repository source means data with a privilege value assigned to the symbolic notations;

reducing a multiple of mnemonic references to a single reference when said multiple references identify the same data object provided by said repository source means; and using mnemonic notations to describe the placement order of current data by its position within a future transmission, said data being portions of content provided by said repository source means.

7. The method of claim 6, further comprising the step of incorporating a notational fragment into a sequence of fragment files, said sequence being instructional means to an interpreter to assemble data into a transmission or into a format understood by a repository source means.

\* \* \* \* \*